US011414882B2

(12) United States Patent
Ke et al.

(10) Patent No.: US 11,414,882 B2
(45) Date of Patent: Aug. 16, 2022

(54) STEEL STRUCTURE COOLING TOWER

(71) Applicant: Nanjing University of Aeronautics and Astronautics, Nanjing (CN)

(72) Inventors: Shitang Ke, Nanjing (CN); Hongxin Wu, Nanjing (CN); Jie Yang, Nanjing (CN); Lin Du, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 5 days.

(21) Appl. No.: 17/267,041

(22) PCT Filed: Jul. 9, 2020

(86) PCT No.: PCT/CN2020/101011
§ 371 (c)(1),
(2) Date: Feb. 9, 2021

(87) PCT Pub. No.: WO2021/120606
PCT Pub. Date: Jun. 24, 2021

(65) Prior Publication Data
US 2022/0090403 A1    Mar. 24, 2022

(30) Foreign Application Priority Data
Dec. 20, 2019   (CN) .......................... 201922310061.9

(51) Int. Cl.
*E04H 5/12*   (2006.01)
*E04H 9/14*   (2006.01)
(52) U.S. Cl.
CPC ................. *E04H 5/12* (2013.01); *E04H 9/14* (2013.01)

(58) Field of Classification Search
CPC .... E04H 5/12; E04H 5/02; E04H 5/08; E04H 5/10; E04H 9/14; E04H 7/02; E04H 7/04;
(Continued)

(56) References Cited

U.S. PATENT DOCUMENTS 1,283,338 A * 10/1918 Simon .................... E04B 2/827
52/64
2,814,435 A * 11/1957 Fordyce ................... F28C 1/00
261/DIG. 11
(Continued)

FOREIGN PATENT DOCUMENTS

CN    205655735 U    10/2016
CN    205894770 U    1/2017
(Continued)

*Primary Examiner* — Kyle J. Walraed-Sullivan
(74) *Attorney, Agent, or Firm* — Bayramoglu Law Offices LLC

(57) ABSTRACT

The present invention provides a steel structure cooling tower, including a truss system, a hyperbolic enclosure plate system and an opening-closing system. Hoop trusses and meridional trusses are connected crisscross to form a force transfer structure of the steel structure cooling tower, thereby improving the overall stability of a tower body of the cooling tower and reducing the wind pressure on the tower body. An enclosure plate is mounted on the hoop truss by an enclosure plate bracket assembly, the opening-closing system is laid on the hoop truss, and a wind and rain sensor is installed on a hoop truss on the top of the tower body of the cooling tower. When typhoon rain exceeds a limiting value, an opening-closing posture of the hyperbolic enclosure plate is adjusted, so that the steel structure cooling tower can open the enclosure plate to reduce a wind load acting on the tower body.

7 Claims, 4 Drawing Sheets

(58) Field of Classification Search
CPC .... E04H 7/06; E04H 7/22; E04H 7/30; G09F 7/22
USPC ................................ 52/80.2, 81.1, 81.2, 81.3
See application file for complete search history.

(56) References Cited

U.S. PATENT DOCUMENTS

| | | | | |
|---|---|---|---|---|
| 3,077,008 | A * | 2/1963 | De Flon | E04H 5/12 52/249 |
| 3,196,895 | A * | 7/1965 | Dayus | F24F 13/15 137/601.11 |
| 3,618,277 | A * | 11/1971 | Waters | E04B 1/3404 52/30 |
| 3,884,414 | A * | 5/1975 | Baer | F24S 50/20 49/31 |
| 3,918,518 | A * | 11/1975 | James | E04H 5/12 52/2.21 |
| 3,922,827 | A * | 12/1975 | Rosenblatt | E04H 5/12 52/80.1 |
| 4,010,580 | A * | 3/1977 | Mayr | E04H 5/12 261/DIG. 11 |
| 4,060,575 | A * | 11/1977 | Uhlirsch | E04H 5/12 52/630 |
| 4,092,811 | A * | 6/1978 | Lin | E04H 5/12 52/80.1 |
| 4,098,034 | A * | 7/1978 | Howell | E04B 1/98 52/1 |
| 4,128,307 | A * | 12/1978 | Badertscher | A01G 9/222 49/82.1 |
| 4,232,495 | A * | 11/1980 | Lin | E04H 5/12 261/DIG. 11 |
| 4,261,147 | A * | 4/1981 | Agsten | E04H 5/12 52/432 |
| 4,267,883 | A * | 5/1981 | Maurice | E04H 5/12 261/DIG. 11 |
| 4,388,785 | A * | 6/1983 | Queffelec | E04H 5/12 52/80.1 |
| 4,527,355 | A * | 7/1985 | Numakami | E04F 10/10 49/90.1 |
| 4,706,554 | A * | 11/1987 | Baldino | F28F 25/12 261/DIG. 11 |
| 4,912,865 | A * | 4/1990 | Ellsworth | G09F 7/22 40/602 |
| 4,926,599 | A * | 5/1990 | Scholz | E04F 10/10 49/90.1 |
| 5,072,553 | A * | 12/1991 | Bozetto | E04H 5/12 261/DIG. 11 |
| 5,306,210 | A * | 4/1994 | Smit | F24F 13/15 52/473 |
| 5,655,335 | A * | 8/1997 | Vermeer | E04B 7/163 52/13 |
| 5,862,633 | A * | 1/1999 | Van Ells | F24F 5/00 135/117 |
| 8,413,389 | B2 * | 4/2013 | Frigerio | E04F 10/10 52/302.1 |
| 8,413,705 | B2 * | 4/2013 | Castel | E04B 7/163 160/174 R |
| 8,756,873 | B1 * | 6/2014 | Hire | E04F 10/10 49/82.1 |
| 8,763,323 | B1 * | 7/2014 | Even | E04H 7/22 52/192 |
| 8,800,214 | B2 * | 8/2014 | Silberman | E04F 10/02 52/72 |
| 9,217,582 | B2 * | 12/2015 | Frazier | F24S 23/74 |
| 9,422,715 | B1 * | 8/2016 | Selzer | E04D 11/00 |
| 9,657,475 | B1 * | 5/2017 | Steele | E04B 9/003 |
| 10,094,122 | B1 * | 10/2018 | Akbulut | E04B 7/163 |
| 10,815,689 | B2 * | 10/2020 | Ji | E04F 10/10 |
| 11,015,349 | B2 * | 5/2021 | Byszenski | E04B 7/163 |
| 11,076,509 | B2 * | 7/2021 | Alissa | H05K 7/20836 |
| 11,149,438 | B2 * | 10/2021 | Torman | E04F 10/10 |
| 11,168,481 | B2 * | 11/2021 | Rieber | E04F 10/10 |
| 2004/0148899 | A1 * | 8/2004 | Pertile | E04F 10/10 52/581 |
| 2006/0005473 | A1 * | 1/2006 | Friedman | E04B 7/14 52/24 |
| 2006/0273294 | A1 * | 12/2006 | Dombroski | E04H 17/16 256/24 |
| 2008/0250735 | A1 * | 10/2008 | Patterson | E04D 13/033 52/173.3 |
| 2009/0120016 | A1 * | 5/2009 | Hon | H02S 20/00 52/173.3 |
| 2010/0139185 | A1 * | 6/2010 | Neighbors | E04H 7/06 52/745.01 |
| 2013/0212946 | A1 * | 8/2013 | Villarreal, Jr. | E06B 7/084 49/90.1 |
| 2013/0283656 | A1 * | 10/2013 | Melic | G09F 19/226 40/602 |
| 2013/0291438 | A1 * | 11/2013 | Selzer | E04B 7/163 49/82.1 |
| 2014/0175240 | A1 * | 6/2014 | Selzer | E04B 7/163 49/82.1 |
| 2014/0251929 | A1 * | 9/2014 | Fidler | G09F 15/0087 211/1.3 |
| 2014/0373466 | A1 * | 12/2014 | Mockry | E04H 5/12 52/223.3 |
| 2015/0092400 | A1 * | 4/2015 | Vincenzi | H02S 20/30 362/183 |
| 2015/0376901 | A1 * | 12/2015 | Partridge | A62C 2/241 52/64 |
| 2016/0115688 | A1 * | 4/2016 | Weaver | E04D 13/064 49/82.1 |
| 2016/0177575 | A1 * | 6/2016 | Ivic | E04F 10/08 52/302.1 |
| 2017/0121966 | A1 * | 5/2017 | Jiang | E04B 9/003 |
| 2017/0207744 | A1 * | 7/2017 | Densham | F24S 23/77 |
| 2018/0080433 | A1 * | 3/2018 | Te | G09F 11/025 |
| 2018/0106046 | A1 * | 4/2018 | Castel | E04F 10/0607 |
| 2018/0195264 | A1 * | 7/2018 | Matsuura | E04H 7/20 |
| 2018/0364746 | A1 * | 12/2018 | Boisjoli | E04H 7/22 |
| 2019/0323232 | A1 * | 10/2019 | Mitchell | E04B 7/163 |
| 2019/0386606 | A1 * | 12/2019 | Raghunathan | H02S 20/26 |
| 2020/0217070 | A1 * | 7/2020 | Fanning | E04B 7/163 |
| 2020/0349869 | A1 * | 11/2020 | Ritter, Jr. | G09F 7/22 |
| 2020/0370299 | A1 * | 11/2020 | Shan | E04F 10/10 |
| 2021/0062505 | A1 * | 3/2021 | Elmore | E04F 10/10 |
| 2022/0069102 | A1 * | 3/2022 | Yang | H01L 29/66545 |

FOREIGN PATENT DOCUMENTS

| | | |
|---|---|---|
| CN | 206581653 U | 10/2017 |
| CN | 208416038 U | 1/2019 |
| CN | 110504911 A | 11/2019 |
| CN | 111021795 A | 4/2020 |
| SU | 1038455 A1 | 8/1983 |

\* cited by examiner

STEEL STRUCTURE COOLING TOWER

CROSS REFERENCE TO THE RELATED APPLICATIONS

This application is the national phase entry of International Application No. PCT/CN2020/101011, filed on Jul. 9, 2020, which is based upon and claims priority to Chinese Patent Application No. 201922310061.9, filed on Dec. 20, 2019, the entire contents of which are incorporated herein by reference.

TECHNICAL FIELD

The present invention belongs to the technical field of cooling towers, and more particularly, to an adaptive steel structure cooling tower for resisting a severe typhoon.

BACKGROUND

Cooling towers as highly efficient apparatus are used to release waste heat of thermal power plants. Such towers have grown significantly in proportion to the amount of power produced by modern plants and tend to an ultra-high size. The safety margins of such flexible tower bodies, however, have decreased over the years. China has a long coastline and frequent typhoons. Rapid coastal economic development and increased electricity consumption has resulted in construction of more and more cooling towers along the coast. Cooling towers located within typhoon range with exposure to excessive wind loads has also increased sharply.

In order to improve structural stability of the cooling tower, a steel structure, like the one proposed in Chinese patent application No. 201620659993.8 has been proposed. That steel structure cooling tower has a crossed truss pattern, wherein a tower shape adopts a hyperbolic shape or a straight-cone shape, so that the tower can ensure uniform force applied to a tower body, and enhance the structure's stability. Anti-typhoon and aseismic performances, as well as the adaptability of the tower's curvature are all improved. A large windward area caused by the trend of ultra-high cooling towers, however, means that the cooling tower remains vulnerable to excessive wind loads under an extremely severe typhoon environment, which further causes a problem of increasing difficulty in the design of the cooling tower structure. This shortcoming is not addressed by the crossed truss pattern of the steel structure cooling tower disclosed in Chinese patent application No. 201620659993.8.

The magnitude of the wind load acting on the surface of the tower body of the cooling tower is decided by a wind pressure multiplied by the windward area. The active control opening and closing system has been applied in the fields of electric windows and the like, but it is mainly used to solve manpower problems and smart homes, and has not been effectively applied to steel structure cooling towers. Therefore, the intelligent opening and closing technology of the enclosure plate of the steel structure cooling tower has detailed and advanced technical reserves and broad application prospects.

Thus, the intelligent opening and closing technology of the enclosure plate is applied to the steel structure cooling tower to enable the cooling tower to actively control and adjust the windward area in a severe typhoon environment, which can effectively reduce the wind loads acting on the surface of the tower body and further directly decrease the design loads of the cooling tower structure.

SUMMARY OF INVENTION

A technical problem to be resolved by the present invention is to provide an adaptive steel structure cooling tower for resisting a severe typhoon with respect to the shortcomings of the above-mentioned prior art. The adaptive steel structure cooling tower bears a structural load through a truss system, provides a hyperbolic aerodynamic shape of the cooling tower by mounting a hyperbolic enclosure plate system on the truss system to enclose the truss system to form a tower body of the cooling tower, and controls transition of an opening-closing posture of the hyperbolic enclosure plate by a servo opening-closing system to enable the cooling tower to open the enclosure plate in a severe typhoon environment, thereby effectively reducing the wind load acting on the cooling tower.

In order to realize the above technical objective, the present invention adopts the following technical solution.

An adaptive steel structure cooling tower for resisting a severe typhoon includes a truss system, a hyperbolic enclosure plate system and a servo opening-closing system. The truss system includes a plurality of hoop trusses and a plurality of meridional trusses, and the hoop trusses and the meridional trusses are crisscross connected to each other to form a bearing skeleton of the cooling tower. The hyperbolic enclosure plate system is installed in each space enclosed by the adjacent hoop truss and meridional truss. The outer side of the hoop truss and the outer side of the meridional truss protrude outwardly to the outer side of the hyperbolic enclosure plate system. The hyperbolic enclosure plate system includes a hyperbolic enclosure plate, a hyperbolic enclosure plate hoop bracket, a hyperbolic enclosure plate meridional bracket, a hyperbolic enclosure plate rotating pendant and a rotating motor. The hyperbolic enclosure plate is fixedly installed on an enclosure skeleton formed by the hyperbolic enclosure plate hoop bracket and the hyperbolic enclosure plate meridional bracket, and the hyperbolic enclosure plate rotating pendant is fixedly connected to the enclosure skeleton. The hyperbolic enclosure plate rotating pendant is parallel to the hyperbolic enclosure plate meridional bracket, and the hyperbolic enclosure plate rotating pendant is located at the middle of the enclosure skeleton. The upper end and the lower end of the hyperbolic enclosure plate rotating pendant separately position the corresponding hoop truss and are connected to the corresponding hoop truss. The hyperbolic enclosure plate rotating pendant rotates around its own axis. The rotating motor is installed on the hyperbolic enclosure plate rotating pendant, and the rotating motor is configured to drive the hyperbolic enclosure plate rotating pendant to rotate to enable the hyperbolic enclosure plate to rotate at least 90° around the axis of the hyperbolic enclosure plate rotating pendant. The servo opening-closing system includes a wind and rain sensor, and a controller. The wind and rain sensor is installed on the hoop truss at the top of the cooling tower, and is configured to measure wind pressure and rain intensity on the top of the cooling tower. The wind and rain sensor is connected to the controller, and the controller is connected to each rotating motor. When typhoon rain exceeds a limiting value, the wind and rain sensor transmits a signal to the controller, and the controller controls each rotating motor to rotate to enable the hyperbolic enclosure plate to be parallel to a wind incoming direction.

The hyperbolic enclosure plate system includes a plurality of hyperbolic enclosure plates, a plurality of hyperbolic enclosure plate hoop brackets, a plurality of hyperbolic enclosure plate meridional brackets, and a plurality of hyperbolic enclosure plate rotating pendants. Each of the hyperbolic enclosure plates is fixed on an enclosure skeleton formed by the corresponding hyperbolic enclosure plate hoop bracket and hyperbolic enclosure plate meridional bracket. Each enclosure skeleton is installed with the hyperbolic enclosure plate rotating pendant. The hyperbolic enclosure plate system is provided with only one rotating motor. The rotating motor is connected to one of the hyperbolic enclosure plate rotating pendants. All enclosure skeletons are connected by one connection rod, and the connection rod is hinged to all enclosure skeletons. When the rotating motor drives one hyperbolic enclosure plate rotating pendant connected to the rotating motor to rotate, the hyperbolic enclosure plate rotating pendant drives the connection rod to shift, and the connection rod drives the remaining enclosure skeletons to follow, so that all hyperbolic enclosure plates in one hyperbolic enclosure plate system perform a uniform action.

In order to optimize the above technical solution, the present invention further includes the following specific measures.

The truss system is in a shape steel structure or a grid structure.

The wind and rain sensor adopts a BALUK363 wireless sensor, wherein the BALUK363 wireless sensor is configured to detect a wind pressure and rain intensity signal and transfer the wind pressure and rain intensity signal as a radio signal to the controller. The controller adopts a Delta servo B2 series motor driver, wherein the Delta servo B2 series motor driver is configured to generate and transfer a motor control signal to the rotating motor when a wind pressure and rain intensity electromagnetic signal received by the Delta servo B2 series motor driver exceeds a limiting value. The rotating motor adopts a K8178R direct current (DC) remote control motor.

The hoop truss includes a hoop truss inner chord, a hoop truss outer chord and a hoop truss web member. The hoop truss outer chord is horizontally welded on the outer side of the hoop truss inner chord through the hoop truss web member. The left and right adjacent hoop truss web members are connected end-to-end.

The meridional truss includes a meridional truss inner chord, a meridional truss outer chord and a meridional truss web member. The meridional truss outer chord is longitudinally welded on an outer side of the meridional truss inner chord through the meridional truss web member. The upper and lower adjacent meridional truss web members are connected end-to-end.

The hoop truss web member and the meridional truss web member at a crisscross position are connected by welding, and the meridional truss outer chord and the hoop truss outer chord at a crisscross position are connected by welding.

The present invention has the following advantages:

1) The hoop trusses of the truss system are uniformly distributed along a height of the tower body of the cooling tower to constrain horizontal deformation of a cooling tower shell, while the meridional trusses are distributed along the meridional direction to constrain the overall overturning deformation of the tower body of the cooling tower. Therefore, the cooling tower has functions of rigid rings and meridional ribs, and the overall stability of the tower body of the cooling tower can be significantly improved.

2) The truss system protrudes outwardly on the surface of the hyperbolic enclosure plate system to effectively increase the roughness of the surface of the tower body of the cooling tower, thereby reducing a velocity of a vortex flowing through the tower body of the cooling tower and being separated from a boundary to further effectively reduce wind pressure on the surface of the tower body of the cooling tower.

3) Compared with traditional cooling towers, the present invention lays the hyperbolic enclosure plate system on the surface of the tower body of the cooling tower, and the servo opening-closing system controls the rotating motor to drive the hyperbolic enclosure plate system to adjust the opening-closing posture according to the detected wind pressure and rain intensity on the tower top in a shutdown environment when the severe typhoon comes. In a closing posture, the hyperbolic enclosure plate system can enclose to form the hyperbolic barrel of the cooling tower to provide an aerodynamic shape of the cooling tower for natural circulate ventilation. In an opening posture, the hyperbolic enclosure plate system effectively reduces the windward area of the tower body of the cooling tower to further directly reduce the wind load of the structural design of the cooling tower and improve the safety margin of the structural design.

Figure 1:
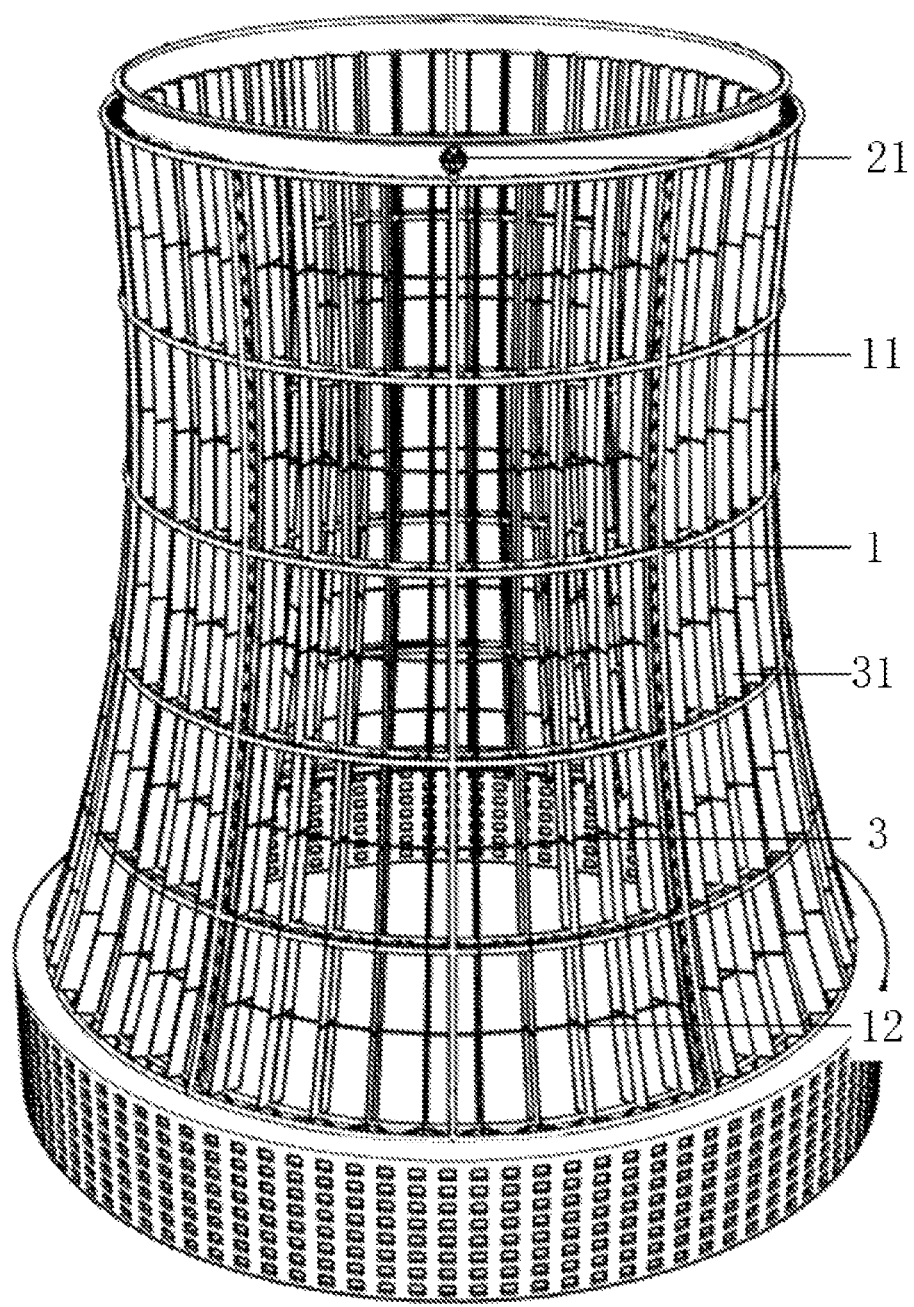
FIG. 1 is a schematic diagram of an open posture of the structure of the present invention.

In the figures: truss System 1, hoop truss 11, hoop truss inner chord 11a, hoop truss outer chord 11b, hoop truss web member 11c, meridional truss 12, meridional truss inner chord 12a, meridional truss outer chord 12b, meridional truss web member 12c, servo opening-closing system 2, wind and rain sensor 21, hyperbolic enclosure plate system 3, hyperbolic enclosure plate 31, hyperbolic enclosure plate hoop bracket 32, hyperbolic enclosure plate meridional bracket 33, hyperbolic enclosure plate rotating pendant 34, rotating motor 35, and connection rod 36.

DETAILED DESCRIPTION OF THE EXEMPLARY EMBODIMENTS

An embodiment of the present invention is further described in detail below with reference to the drawings.

Figure 2:
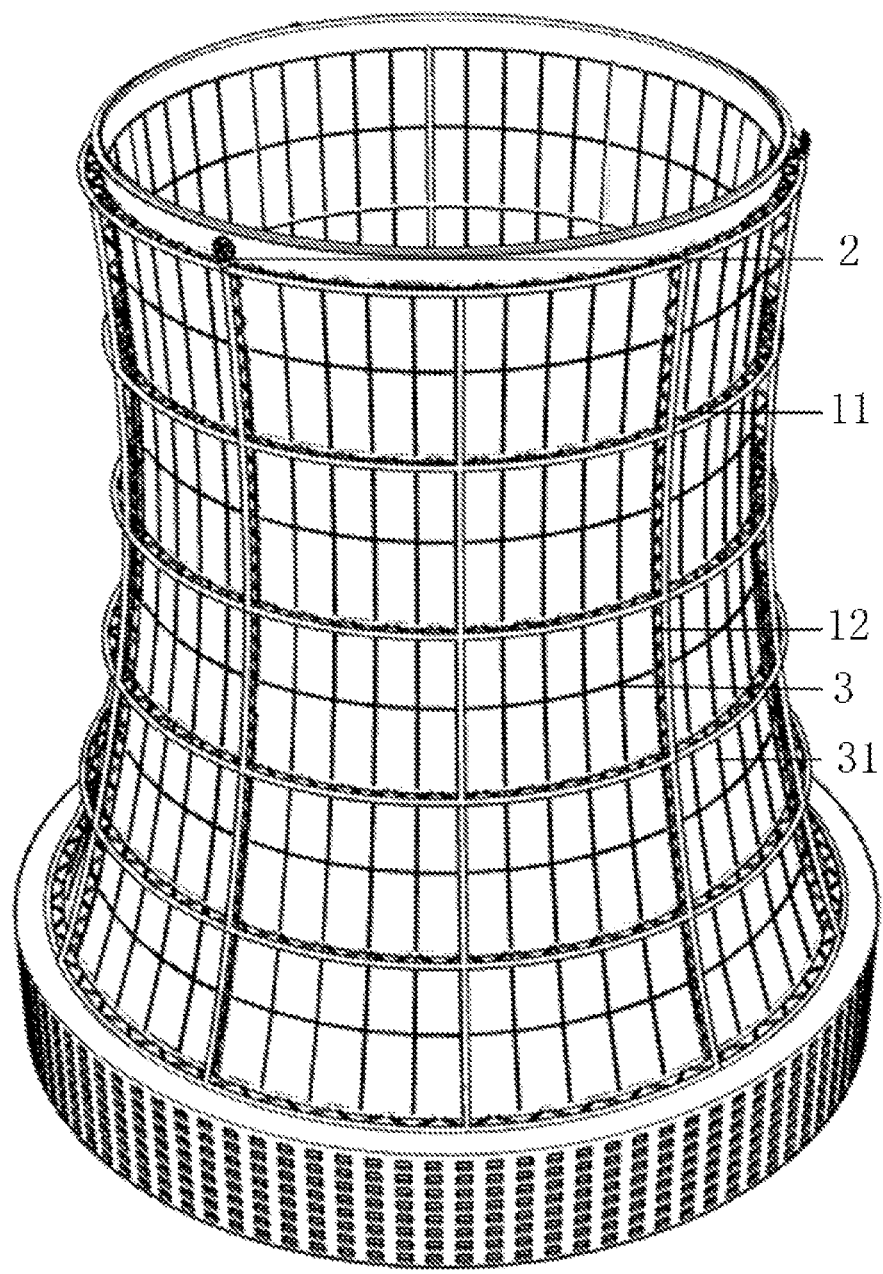
FIG. 2 is a schematic diagram of a closed posture of the structure of the present invention.
Figure 3:
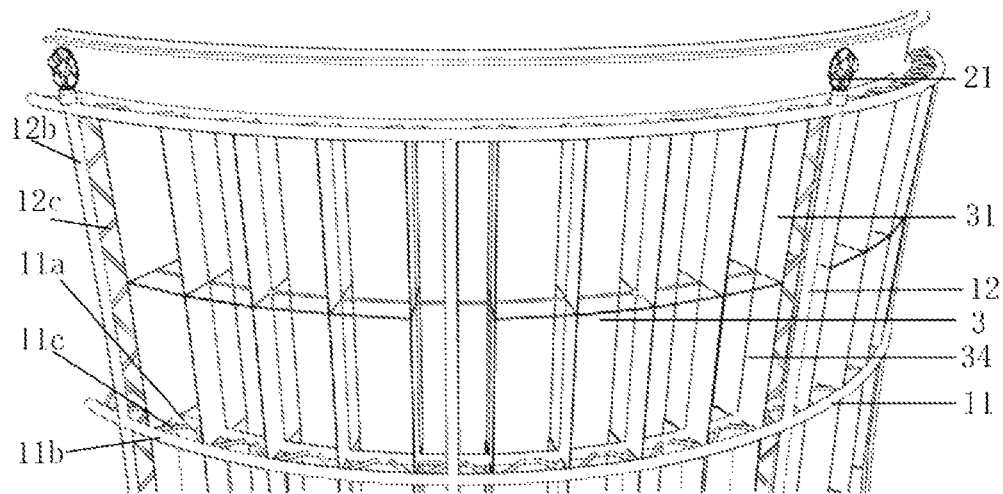
FIG. 3 is a schematic diagram of the structures of the truss system and the hyperbolic enclosure plate system of FIG. 1.
Figure 4:
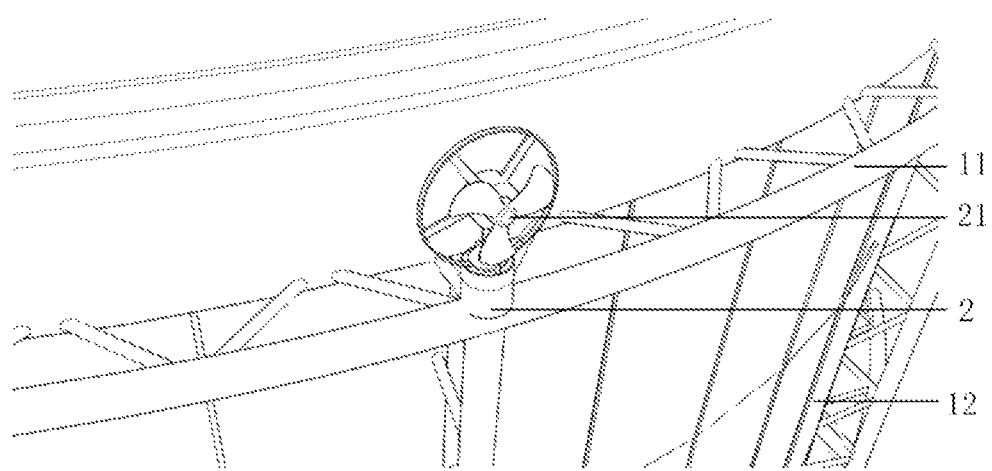
FIG. 4 is a schematic diagram of the connection between a wind and rain sensor and a hoop truss of FIG. 1.
Figure 5:
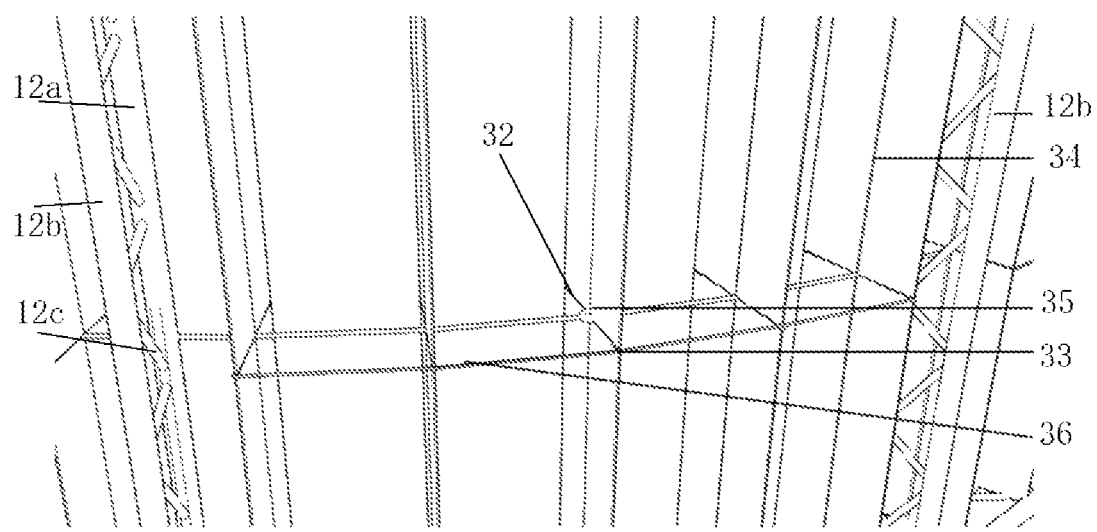
FIG. 5 is a schematic diagram of the structure of the hyperbolic enclosure plate of FIG. 1.

An embodiment of the present invention provides an adaptive steel structure cooling tower for resisting a severe typhoon. As shown in FIGS. 1 and 2, the adaptive steel structure cooling tower for resisting the severe typhoon is a cooling tower with steel truss and natural ventilation having a height of 110$m$, of which a bottom leg has a height of 20$m$. The adaptive steel structure cooling tower for resisting the severe typhoon includes the truss system 1, the hyperbolic enclosure plate system 3 and the servo opening-closing system 2. The truss system 1 includes a plurality of hoop trusses 11 and a plurality of meridional trusses 12, and the hoop trusses 11 and the meridional trusses 12 are crisscross connected to each other to form a bearing skeleton of the cooling tower. The hoop trusses 11 are uniformly distributed along the height of the tower body of the cooling tower to constrain the horizontal deformation of a cooling tower shell, while the meridional trusses 12 are distributed along the meridional direction to constrain the overall overturning deformation of the tower body of the cooling tower. Therefore, the cooling tower has functions of rigid rings and meridional ribs, and the overall stability of the tower body of the cooling tower can be significantly improved. The truss system can effectively increase the roughness of the surface of the tower body of the cooling tower, to reduce a velocity of a vortex flowing through the tower body of the cooling tower and being separated from a boundary, so as to further effectively reduce wind pressure on the surface of the tower body of the cooling tower. The hyperbolic enclosure plate system 3 is installed in each space enclosed by the adjacent hoop truss 11 and meridional truss 12. The outer side of the hoop truss 11 and the outer side of the meridional truss 12 protrude outwardly to the outer side of the hyperbolic enclosure plate system 3. The hyperbolic enclosure plate system 3 includes the hyperbolic enclosure plate 31, the hyperbolic enclosure plate hoop bracket 32, the hyperbolic enclosure plate meridional bracket 33, the hyperbolic enclosure plate rotating pendant 34 and the rotating motor 35. The hyperbolic enclosure plate 31 is fixedly installed on an enclosure skeleton formed by the hyperbolic enclosure plate hoop bracket 32 and the hyperbolic enclosure plate meridional bracket 33, and the hyperbolic enclosure plate rotating pendant 34 is fixedly connected to the enclosure skeleton. The hyperbolic enclosure plate rotating pendant 34 is parallel to the hyperbolic enclosure plate meridional bracket 33, and the hyperbolic enclosure plate rotating pendant 34 is located at the middle of the enclosure skeleton. The upper end and the lower end of the hyperbolic enclosure plate rotating pendant 34 separately position the corresponding hoop truss 11 and are connected to the corresponding hoop truss 11. The hyperbolic enclosure plate rotating pendant 34 is capable of rotating around its own axis. The rotating motor 35 is installed on the hyperbolic enclosure plate rotating pendant 34, and the rotating motor 35 is configured to drive the hyperbolic enclosure plate rotating pendant 34 to rotate to enable the hyperbolic enclosure plate 31 to rotate at least 90° around the axis of the hyperbolic enclosure plate rotating pendant 34. The servo opening-closing system 2 includes the wind and rain sensor 21, and a controller. The wind and rain sensor 21 is installed on the hoop truss 11 at the top of the cooling tower, and is configured to measure wind pressure and rain intensity on the top of the cooling tower. The wind and rain sensor 21 is connected to the controller, and the controller is connected to each rotating motor 35. When typhoon rain exceeds a limiting value, the wind and rain sensor 21 transmits a signal to the controller, and the controller controls each rotating motor 35 to rotate to enable the hyperbolic enclosure plate 31 to be parallel to a wind incoming direction, so that the windward area of the tower body of the cooling tower is sharply reduced, thereby directly reducing the wind load of the structural design of the cooling tower.

In an embodiment, the hyperbolic enclosure plate system 3 includes ten hyperbolic enclosure plates 31, one hyperbolic enclosure plate hoop bracket 32, one hyperbolic enclosure plate meridional bracket 33, and ten hyperbolic enclosure plate rotating pendants 34. Each of the hyperbolic enclosure plates 31 is fixed on the enclosure skeleton formed by the corresponding hyperbolic enclosure plate hoop bracket 32 and hyperbolic enclosure plate meridional bracket 33. Each enclosure skeleton is installed with the hyperbolic enclosure plate rotating pendant 34. The hyperbolic enclosure plate system 3 is provided with only one rotating motor 35. The rotating motor 35 is connected to one of the hyperbolic enclosure plate rotating pendants 34. All enclosure skeletons are connected by one connection rod 36, and the connection rod 36 is hinged to all enclosure skeletons. When the rotating motor 35 drives the one hyperbolic enclosure plate rotating pendant 34 connected to the rotating motor 35 to rotate, the hyperbolic enclosure plate rotating pendant 34 can drive the connection rod 36 to shift, and the connection rod 36 drives the remaining enclosure skeletons to follow, so that all hyperbolic enclosure plates 31 in one hyperbolic enclosure plate system 3 perform the uniform action.

In an embodiment, the truss system 1 has a shape steel structure or a grid structure. In an embodiment, the wind and rain sensor 21 adopts a BALUK363 wireless sensor, which can detect a wind pressure and rain intensity signal and transfer it as a radio signal to the controller. The controller adopts a Delta servo B2 series motor driver that generates and transfers a motor control signal to the rotating motor 35 when its received wind pressure and rain intensity electromagnetic signal exceeds a limiting value. The rotating motor 35 adopts a K8178R direct current (DC) remote control motor.

In an embodiment, the hoop truss 11 includes the hoop truss inner chord 11a, the hoop truss outer chord 11b, and the hoop truss web members 11c. The hoop truss outer chord 11b is horizontally welded on the outer side of the hoop truss inner chord 11a through the hoop truss web members 11c. The left and right adjacent hoop truss web members 11c are connected end-to-end.

In an embodiment, the meridional truss 12 includes the meridional truss inner chord 12a, the meridional truss outer chord 12b, and the meridional truss web members 12c. The meridional truss outer chord 12b is longitudinally welded on an outer side of the meridional truss inner chord 12a through the meridional truss web members 12c. The upper and lower adjacent meridional truss web members 12c are connected end-to-end.

In an embodiment, the hoop truss web member 11c and the meridional truss web member 12c at a crisscross position are connected by welding, and the meridional truss outer chord 12b and the hoop truss outer chord 11b at a crisscross position are connected by welding.

The hyperbolic enclosure plate hoop bracket 32 and the hyperbolic enclosure plate meridional bracket 33 of the present invention are formed from steel. The hyperbolic enclosure plate 31 of the present invention is shaped by splicing modular commercial enclosure plates. The radian of the hyperbolic enclosure plate 31, the radian of the hyperbolic enclosure plate hoop bracket 32 and the radian of the hyperbolic enclosure plate meridional bracket 33 of the present invention are adapted to the tower body of the cooling tower.

The above embodiments are preferred embodiments of the present invention, and the scope of protection of the present invention is not merely limited to the above embodiments. Any technical solution under the concept of the present invention shall fall within the scope of protection of the present invention. It should be pointed out that, any improvement and polishing made by those having ordinarily skilled in the art without departing from the principle of the present invention shall fall within the scope of protection of the present invention.

What is claimed is:
1. A steel structure cooling tower, wherein the steel structure cooling tower comprises:

a truss system, a hyperbolic enclosure plate system and an opening-closing system;

wherein the truss system comprises a plurality of hoop trusses and a plurality of meridional trusses, and the plurality of hoop trusses and the plurality of meridional trusses are crisscross connected to each other to form a bearing skeleton of the steel structure cooling tower, wherein the hyperbolic enclosure plate system is installed in each space enclosed by a hoop truss of the plurality of hoop trusses and a meridional truss of the plurality of meridional trusses, wherein the hoop truss and the meridional truss are adjacent to each other; and an outer side of the hoop truss and an outer side of the meridional truss protrude outwardly to an outer side of the hyperbolic enclosure plate system;

wherein the hyperbolic enclosure plate system comprises a hyperbolic enclosure plate, a hyperbolic enclosure plate hoop bracket, a hyperbolic enclosure plate meridional bracket, a hyperbolic enclosure plate rotating pendant and a rotating motor; the hyperbolic enclosure plate is fixedly installed on an enclosure skeleton, wherein the enclosure skeleton is formed by the hyperbolic enclosure plate hoop bracket and the hyperbolic enclosure plate meridional bracket; the hyperbolic enclosure plate rotating pendant is fixedly connected to the enclosure skeleton; the hyperbolic enclosure plate rotating pendant is parallel to the hyperbolic enclosure plate meridional bracket, and the hyperbolic enclosure plate rotating pendant is located at a middle of the enclosure skeleton; an upper end and a lower end of the hyperbolic enclosure plate rotating pendant separately correspondingly position the hoop truss and are correspondingly connected to the hoop truss; the hyperbolic enclosure plate rotating pendant rotates around an axis of the hyperbolic enclosure plate rotating pendant; the rotating motor is installed on the hyperbolic enclosure plate rotating pendant, and the rotating motor is configured to drive the hyperbolic enclosure plate rotating pendant to rotate to enable the hyperbolic enclosure plate to rotate at least 90° around the axis of the hyperbolic enclosure plate rotating pendant; and wherein the opening-closing system comprises a wind and rain sensor, and a controller; the wind and rain sensor is installed on a hoop truss at a top of the steel structure cooling tower, and the wind and rain sensor is configured to measure a wind pressure and a rain intensity on the top of the steel structure cooling tower; the wind and rain sensor is connected to the controller, and the controller is connected to each the rotating motor; wherein the wind and rain sensor is configured to transmit a signal to the controller upon a rain amount exceeding a limiting value, and the controller controls the rotating motor to rotate to enable the hyperbolic enclosure plate to be parallel to a wind incoming direction.

2. The steel structure cooling tower of claim 1, wherein the hyperbolic enclosure plate system comprises a plurality of hyperbolic enclosure plates, a plurality of hyperbolic enclosure plate hoop brackets, a plurality of hyperbolic enclosure plate meridional brackets, and a plurality of hyperbolic enclosure plate rotating pendants; each hyperbolic enclosure plate of the plurality of hyperbolic enclosure plates is fixed on an enclosure skeleton of the plurality of enclosure skeletons correspondingly formed by the plurality of hyperbolic enclosure plate hoop brackets and the plurality of hyperbolic enclosure plate meridional brackets; each enclosure skeleton of the plurality of enclosure skeletons is installed with the plurality of hyperbolic enclosure plate rotating pendants; the hyperbolic enclosure plate system is provided with the rotating motor; the rotating motor is connected to one hyperbolic enclosure plate rotating pendant of the plurality of hyperbolic enclosure plate rotating pendants; all the plurality of enclosure skeletons are connected by one connection rod, and the one connection rod is hinged to the plurality of enclosure skeletons; when the rotating motor drives the one hyperbolic enclosure plate rotating pendant to rotate, the one hyperbolic enclosure plate rotating pendant drives the one connection rod to shift, and the one connection rod drives remaining enclosure skeletons of the plurality of enclosure skeletons to follow, and the plurality of hyperbolic enclosure plates in one the hyperbolic enclosure plate system perform a uniform action.

3. The steel structure cooling tower of claim 2, wherein the truss system is in a steel structure or a grid structure.

4. The steel structure cooling tower of claim 3, wherein the wind and rain sensor comprises a wireless sensor, wherein the wireless sensor is configured to detect a wind pressure and rain intensity electromagnetic signal and transfer the wind pressure and rain intensity electromagnetic signal as a radio signal to the controller;

the controller comprises a motor driver, wherein the motor driver is configured to generate and transfer a motor control signal to the rotating motor when the wind pressure and rain intensity electromagnetic signal received by the motor driver exceeds a limiting value; and the rotating motor comprises a direct current (DC) remote control motor.

5. The steel structure cooling tower of claim 4, wherein the hoop truss comprises a hoop truss inner chord, a hoop truss outer chord and a hoop truss web member; the hoop truss outer chord is horizontally welded on an outer side of the hoop truss inner chord through the hoop truss web member; and left and right adjacent hoop truss web members are connected end-to-end.

6. The steel structure cooling tower of claim 5, wherein the meridional truss comprises a meridional truss inner chord, a meridional truss outer chord and a meridional truss web member; the meridional truss outer chord is longitudinally welded on an outer side of the meridional truss inner chord through the meridional truss web member; and upper and lower adjacent meridional truss web members are connected end-to-end.

7. The steel structure cooling tower of claim 6, wherein the hoop truss web member and the meridional truss web member are connected at a first crisscross position by welding, and the meridional truss outer chord and the hoop truss outer chord are connected at a second crisscross position by welding.

\* \* \* \* \*